(12) United States Patent
Huwig (10) Patent No.: US 10,432,264 B2
(45) Date of Patent: Oct. 1, 2019

(54) METHOD FOR TRANSMITTING ANALOG AND DIGITAL INFORMATION WHILE TRANSMITTING ENERGY

(71) Applicant: ETATRONIX GMBH, St. Wendel (DE)

(72) Inventor: Dominik Huwig, Schmelz (DE)

(73) Assignee: ETATRONIX GMBH, St. Wendel (DE)

( * ) Notice: Subject to any disclaimer, the term of this patent is extended or adjusted under 35 U.S.C. 154(b) by 0 days.

(21) Appl. No.: 15/780,984

(22) PCT Filed: Nov. 17, 2016

(86) PCT No.: PCT/EP2016/078030
§ 371 (c)(1),
(2) Date: Jun. 1, 2018

(87) PCT Pub. No.: WO2017/093038
PCT Pub. Date: Jun. 8, 2017

(65) Prior Publication Data
US 2018/0269928 A1 Sep. 20, 2018

(30) Foreign Application Priority Data
Dec. 2, 2015 (EP) .................................. 15197594

(51) Int. Cl.
*H04B 5/00* (2006.01)
(52) U.S. Cl.
CPC ......... *H04B 5/0031* (2013.01); *H04B 5/0037* (2013.01); *H04B 5/0075* (2013.01); *H04B 5/0093* (2013.01)
(58) Field of Classification Search
CPC .............................. H04B 5/0031; H04B 5/007
(Continued)

(56) References Cited

U.S. PATENT DOCUMENTS 6,418,300 B1 7/2002 Laurent
9,867,062 B1 * 1/2018 Bell ..................... H04W 24/02
(Continued)

FOREIGN PATENT DOCUMENTS

JP 4131483 B2 4/2001

OTHER PUBLICATIONS

International Search Report and Written Decision issued in International Application No. PCT/EP2016/078030, dated Feb. 9, 2017, 12 pp.
(Continued)

*Primary Examiner* — Edward F Urban
*Assistant Examiner* — Max Mathew
(74) *Attorney, Agent, or Firm* — Fitch, Even, Tabin & Flannery LLP (57) ABSTRACT

The invention relates to a method for transmitting analog and digital information while transmitting energy between a power transmitter (10) and a power receiver (12) which is galvanically isolated from the power transmitter, having the following steps: a) providing the analog (22a) and digital (24a) information to be transmitted; b) defining the number $n_{AD}$ of possible values $AD_i$, i=1 to $n_{AD}$ which are possible when digitizing the analog information and defining the value range of the values $AD_i$; c) assigning a digital value $D_x$ (in binary notation) to the digital information; d) defining a minimum number of events $n_{min}$ to be transmitted; e) determining a maximum number of events $n_{max}$ to be transmitted; f) defining a first set of values $n_{low}$ defined by: $n_{low}(AD_i) = n_{min} + f1(AD_i)$, i=1 to $n_{AD}$; g) defining a second set of values $n_{low}$ defined by: $n_{high}(ADi) = n_{max} - f2(AD_i)$, i=1 to $n_{AD}$; h) digitizing the analog information in order to obtain a digital analog value $AD_x$; i) determining a number of events $n_{low}(ADx) = n_{min} + f1(AD_x)$ for the respective digital value $D_x$ bit to be transmitted if the current digital value $D_x$ bit to be (Continued)

transmitted is a 0; and defining a number of events $n_{high}(AD_x)=n_{max}-f2(AD_x)$ for the respective digital value $D_x$ bit to be transmitted if the current digital value $D_x$ bit to be transmitted is a 1 or vice versa; and j) transmitting a signal which correlates at least to the number of events determined in step i). The invention further relates to a corresponding device for carrying out the method.

16 Claims, 5 Drawing Sheets

(58) Field of Classification Search
USPC .................................................. 455/41.1, 41.2
See application file for complete search history.

(56) References Cited

U.S. PATENT DOCUMENTS

| | | | |
|---|---|---|---|
| 2007/0014373 A1 | 1/2007 | Hershbarger | |
| 2010/0054345 A1* | 3/2010 | Yamamoto | H04L 12/10 |
| | | | 375/257 |
| 2011/0057291 A1* | 3/2011 | Slupsky | G08C 17/04 |
| | | | 257/531 |
| 2012/0329405 A1 | 12/2012 | Lee | |
| 2013/0260676 A1 | 10/2013 | Singh | |
| 2014/0235164 A1* | 8/2014 | Vaucher | H04B 5/0031 |
| | | | 455/41.1 |
| 2014/0340033 A1* | 11/2014 | Kim | H02J 7/025 |
| | | | 320/108 |
| 2015/0195048 A1* | 7/2015 | Burkey | A01G 25/092 |
| | | | 455/556.1 |
| 2017/0195008 A1* | 7/2017 | Ko | H04B 5/0031 |
| 2018/0219405 A1* | 8/2018 | Qiu | H04B 5/0037 |
| 2018/0241250 A1* | 8/2018 | Kahlman | H04B 5/0031 |
| 2018/0241255 A1* | 8/2018 | Leabman | H02J 50/40 |
| 2018/0241435 A1* | 8/2018 | Kurz | H04W 4/70 |
| 2018/0241436 A1* | 8/2018 | Kahlman | H01F 38/14 |
| 2018/0254654 A1* | 9/2018 | Ikefuji | H02J 50/12 |
| 2018/0262055 A1* | 9/2018 | Schoenbart | H02J 50/12 |
| 2018/0262236 A1* | 9/2018 | Kahlman | H02J 5/005 |
| 2019/0097459 A1* | 3/2019 | Ettes | H04B 5/0031 |
| 2019/0104473 A1* | 4/2019 | Chun | H04W 52/0235 |
| 2019/0132028 A1* | 5/2019 | Lee | H04B 5/0037 |

OTHER PUBLICATIONS

English Translation of International Preliminary Report on Patentability and Written Decision issued in International Application No. PCT/EP2016/078030, dated Feb. 9, 2017, 8 pp.

* cited by examiner

| $AD_{min} = AD_1$ | $AD_{min} + 1$ | $AD_{min} + 2$ | ... | $AD_{max} = AD_{n_{AD}}$ | $AD_i$ |
|---|---|---|---|---|---|
| $n_{min}$ | $n_{min} + AD_{min} + 1$ | $n_{min} + AD_{min} + 2$ | ... | $n_{min} + AD_{max}$ | $n_{low}(AD)$ |
| $n_{max}$ | $n_{max} - (AD_{min} + 1)$ | $n_{max} - (AD_{min} + 2)$ | ... | $n_{max} - AD_{max}$ | $n_{high}(AD)$ |

Fig.3

$n_{min} = 5 \; ; \; n_{max} = 24 \; ; \; n_{AD} = 8 \; ; \; AD_{min} = 0$

| 0 | 1 | 2 | 3 | 4 | 5 | 6 | 7 | $AD_i$, $i = 1$ to $n_{AD}$ |
|---|---|---|---|---|---|---|---|---|
| 5 | 6 | 7 | 8 | 9 | 10 | 11 | 12 | $n_{low}(AD)$ |
| 24 | 23 | 22 | 21 | 20 | 19 | 18 | 17 | $n_{high}(AD)$ |

0    1  1  0
8 Events [E] = Pause [P], 21E P, 21E P, 8E P,
$n_{low}$   $n_{high}$  $n_{high}$  $n_{low}$ b)

n = 8      n = 21     n = 21     n = 8
$AD_x = 3$  $AD_x = 3$  $AD_x = 3$  $AD_x = 3$
$n_{low}$   $n_{high}$  $n_{high}$  $n_{low}$

Fig.8 a)

8 Events [e], 21Events [E], 21e, 8E ...

b)

n = 8      n = 21     n = 21     n = 8
$AD_x = 3$  $AD_x = 3$  $AD_x = 3$  $AD_x = 3$
$n_{low}$   $n_{high}$  $n_{high}$  $n_{low}$

METHOD FOR TRANSMITTING ANALOG AND DIGITAL INFORMATION WHILE TRANSMITTING ENERGY

CROSS-REFERENCE TO RELATED APPLICATIONS

This application is a U.S. national phase application filed under 37 U.S.C. § 371 of International Application No. PCT/EP2016/078030 filed Nov. 17, 2016, designating the United States, which claims the benefit of European Patent Application No. 15 197 594.3 filed Dec. 2, 2015, both of which are hereby fully incorporated by reference as if fully set forth herein.

The present invention relates to a method for transmitting analog and digital information while transmitting energy between a power transmitter and a power receiver galvanically isolated from said power transmitter. Here, the method comprises the step of providing the analog and digital information to be transmitted. Moreover, the invention relates to an apparatus for implementing such a method.

Figure 1:
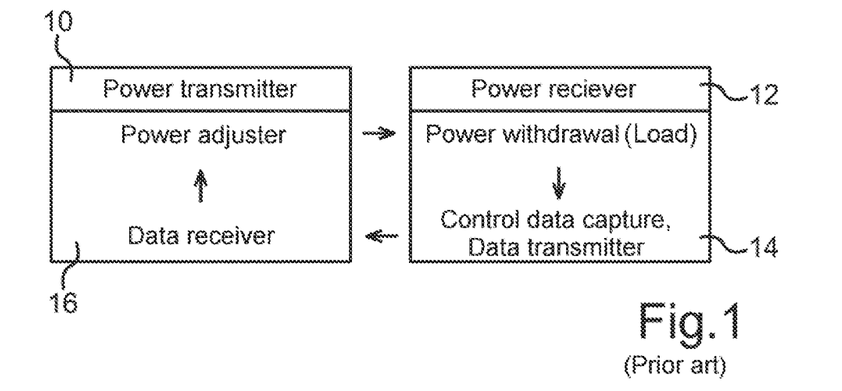
FIG. 1 shows a schematic illustration relating to the power and signal flow in a system for transmitting electrical energy between a power transmitter and a power receiver that is galvanically isolated from said power transmitter.

In many cases, the power is adjusted at the power transmitter for the purposes of increasing the effectiveness and minimizing the required installation space of the power receiver of a wireless energy transmission system. Accordingly, the amount of energy provided for the receiver is controlled on the part of the power transmitter. However, since a regulated output variable, for example a charge voltage and/or a charge current of a battery, is required in most cases, the difficulty arising here is that information that can only be measured on the part of the receiver is required for closing the control loop but the manipulated variable is present on the part of the transmitter. In order nevertheless to facilitate closing a control loop and hence facilitate feedback control, data transmission from the power receiver to the power transmitter is often unavoidable. In this context, FIG. 1 shows the power and signal flow occurring in the process in a schematic illustration. Accordingly, the power adjuster is firstly situated on the side of the power transmitter 10. Said power adjuster transmits power to the power receiver 12, which outputs the received power to a load. Furthermore, control data is captured on the part of the power receiver, with the control data being transmitted to a data receiver 16 on the part of the power transmitter using a data transmitter 14. Said data receiver then controls the power adjuster on the part of the power transmitter according to the received data.

In addition to data transmission of digitized control information that is as fast and exact as possible, additionally it is usually also necessary to transmit status information, such as the charge state of a battery or the switching state of LEDs, for example.

In this respect, two different methods are used in commercial systems: wireless energy transmission systems that are implemented according to the WPC (Wireless Power Consortium) or PMA (Power Matters Alliance) standard use an impedance modulation of the power signal to transmit data from the power receiver to the power transmitter. Since the power transmission is used here as a carrier frequency, which is in the frequency range below 300 kHz, and since there is additional use of a digital, low-frequency modulation, the data rates are very low. By way of example, a data rate significantly below 40 Hz can be ascertained in the WPC standard. Accordingly, the number of digitized measurement values that can be supplied to the digital regulator on the part of the power transmitter are significantly limited, leading to a poor control performance. What still appears acceptable in the case of slowly changing load profiles, such as charging of a battery, for example, is very problematic in the case of dynamic loads. On account of the limited information, the regulator cannot adequately compensate fast load changes or load jumps, and there are strong fluctuations of the controlled variables, such as the output voltage or the output current, for example, as a consequence.

A second, often employed method for digital control uses a separate data channel. A wireless transmission system according to the A4WP (Alliance for Wireless Power) can be mentioned as an example. Here, an additional Bluetooth LP channel is used for the data transmission. The difficulty of a complex modulation method consists of the employed protocols for standardized QAM (quadrature amplitude modulation), PSK (phase shift keying) or FSK (frequency shift keying), e.g., Bluetooth LE, being very comprehensive, which always has a time delay, a dead time or a delay of the evaluation as a consequence. This can provide difficulties from a control-technical point of view.

A further difficulty of the complex modulation method consists of comprehensive evaluation electronics being required for modulation and demodulation in many cases, causing additional costs and increasing the spatial requirements on a printed circuit board.

The object of the present invention consists in developing a method as specified at the outset in such a way that an improvement in the control performance is facilitated. The object furthermore consists of providing a corresponding apparatus for implementing the method.

These objects are achieved by a method having the features of patent claim 1 and by an apparatus having the features of patent claim 16.

The present invention is based on the discovery that what the two aforementioned methods have in common is that no distinction is made between control information and status information within the scope of the transmission. No control information is available in the portion of time in which the charge state, for example, is transmitted from the power receiver back to the power transmitter. This significantly impairs the dynamics of the control.

In order to facilitate an improvement in this case, the present invention provides for facilitating the parallel transmission of digital information in addition to the transmission of digitized analog values, without an impairment of the control performance.

Accordingly, the method according to the invention comprises the following steps:

a) providing the analog and digital information to be transmitted;

b) setting the number $n_{AD}$ of possible values $AD_i$, $i=1$ to $n_{AD}$, that are possible when digitizing the analog information, and the value range of the values $AD_i$;

c) assigning a digital value $D_x$ (in binary notation) to the digital information;

d) setting a minimum event number $n_{min}$ to be transmitted;

e) setting a maximum event number $n_{max}$ to be transmitted;

f) setting a first image $n_{low}$ defined by:

$n_{low}(AD_i) = n_{min} + f1(AD_i)$, $i=1$ to $n_{AD}$;

g) setting a second image $n_{high}$ defined by:

$n_{high}(AD_i) = n_{max} - f2(AD_i)$, $i=1$ to $n_{AD}$;

h) digitizing the analog information for obtaining a digitized analog value $AD_x$;

i) determining an event number $n_{low}(AD_x) = n_{min} + f1(AD_x)$ for the bit of the digital value $D_x$ to be transmitted in each case if the current bit of the digital value $D_x$ to be transmitted is a logical 0; and determining an event number $$n_{high}(ADx)=n_{max}-f2(AD_x)$$

for the bit of the digital value $D_x$ to be transmitted in each case if the current bit of the digital value $D_x$ to be transmitted is a logical 1, or vice versa; and j) transmitting a signal that is correlated at least to the event number determined in step i).

Thus, the parallel transmission of status information is facilitated according to the invention, allowing a control performance to be obtained that is significantly improved over the prior art. For the purposes of optimizing the digital control, this facilitates the transmission of a high constant data flow of digitized control information. Since power transmitter and power receiver are galvanically isolated from one another in the method according to the invention, the transmission channel can be embodied, in particular, for electromagnetic, inductive, capacitive or optical transmission within the scope of the method according to the invention. The method according to the invention is furthermore advantageous in that there is no need for expensive electronics and a microcontroller, which is present in any case for the digital feedback control, can also be used for data transmission.

Preferably, a signal that is correlated to the serial sequence of the event number determined in step i) for each bit of the digital value $D_x$ is transmitted in step j). Hence, an arbitrarily sized value range of digital values can be transmitted by means of the method according to the invention.

In a particularly preferred embodiment, a signal is transmitted for the bit of the digital value to be transmitted, said signal being correlated to both a number of events according to the event number $n_{low}$ determined in step i) and a number of events according to the event number $n_{high}$ determined in step i), wherein a logical 1 of the bit of the digital value $D_x$ to be transmitted in each case is represented by a sequence $n_{high}$-$n_{low}$ and a logical 0 is represented by a sequence $n_{low}$-$n_{high}$ of the amplitude of the signal, or vice versa; in this respect, see the explanations further below in respect of the Manchester code. In this way, a digital symbol has a constant duration and it is accordingly independent of the digitized analog value.

In a preferred embodiment of the method according to the invention, in step j), the event number determined in step i) is transmitted in the form of a certain number of predeterminable events. In the explanations made below, this variant is referred to as direct ADEM (analog-digital event modulation). The variant denoted below as indirect ADEM, which will still be explained in more detail below, differs therefrom.

Within the scope of the ADEM, between the individual bits to be transmitted of the digital value $D_x$ in the signal, a signal differing therefrom can be inserted. In this way, a breakdown of the transmitted events into the individual bits of the digital value $D_x$ is facilitated.

In this context, the signal of the individual bits to be transmitted can comprise a sequence of pulses, with the signal differing therefrom representing a pause, a so-called zero signal. Alternatively, the signal of the individual bits to be transmitted can comprise a predeterminable time duration of a zero signal, with the signal differing therefrom representing a pulse. The last-mentioned variant is particularly advantageous in view of the electrical effectiveness and in view of the electromagnetic compatibility because the excitation of the transmission channel is very low on average.

Instead of the insertion of a signal, it is also possible for an amplitude change to be undertaken in the signal between a current bit of the digital value $D_x$ to be transmitted and a next bit. This allows an increase in the transmission speed to be realized.

In the case of indirect ADEM, already mentioned above, the event number in the form of a signal, determined in step i), with a period duration depending on the event number determined in step i) is transmitted in step j). As a result, use can be made of any signal with a controllable period duration, in particular signals with a sinusoidal form, a rectangular form, sawtooth form and the like.

In this context, it was found to be advantageous if, for the purposes of producing the period duration, an excitation of the transmission with a predeterminable function is activated for a time duration $$t_{on}=n_{low}(AD_i)*\Delta t*D \text{ or } t_{on}=n_{high}(AD_i)*\Delta t*D$$

and deactivated for a time duration $$t_{off}=n_{low}(AD_i)*\Delta t*(1-D) \text{ or } t_{off}=n_{high}(AD_i)*\Delta t*(1-D),$$

where $\Delta t$ is a predeterminable time duration and D is a predeterminable duty cycle.

$\Delta t$ and D can be selected to be constant, but can likewise be modulated for extending the transfer options. Accordingly, the time duration $\Delta t$ and/or the duty cycle D then is varied, in particular modulated, depending on the digitized analog value $AD_x$ to be transmitted; i.e., applies $D=f(AD_x)$.

In all mentioned manifestations of the method according to the invention, the distance of the events can be known, equidistant or arbitrary.

Preferably, the following step is implemented at the receiver of the transmission:

k) evaluating the received signal for determining the transmitted analog value and the transmitted digital value.

In this context, it is particularly preferred for the envelope of the received signal, in particular the period duration of the enveloping function, to be evaluated in step k). This facilitates the implementation of the method according to the invention if the direct determination of the number of events is not possible on account of inertia of the transmission channel.

According to one manifestation of the method according to the invention, $f1(AD_i)$ and $f2(AD_i)$ are chosen in such a way that the first image and the second image are disjoint. In this way, a received signal can be uniquely assigned to the first image $n_{low}$ or to the second image $n_{high}$.

Alternatively, $f1(AD_i)$ and $f2(AD_i)$ can be chosen in such a way that the first image and the second image have a common overlap region, wherein a previously created probability function is used in step k) for determining the transmitted analog value and the transmitted digital value for a value in the overlap region. This variant is advantageous in that this can increase the transmission speed.

In this context, it is preferable for the method according to the invention to furthermore comprise the following step:

l) creating a probability function for the assignment of values in the overlap range to the first or second image depending on at least one previously transmitted value that is uniquely assignable to the first or the second image.

Further preferred embodiments emerge from the dependent claims.

To the extent that they are applicable, the preferred embodiments presented in relation to the method according to the invention, and the advantages thereof, apply analogously to an apparatus according to the invention for implementing the method according to the invention.

Exemplary embodiments of the present invention are now described in more detail below with reference to the attached drawings. In the drawings.

The same reference signs are used for the same components and components with the same effect.

Figure 2:
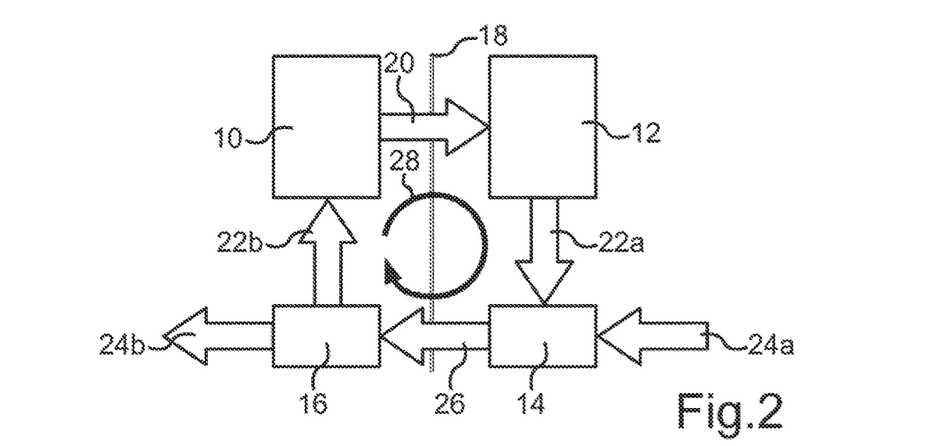
FIG. 2 shows a schematic illustration of an apparatus according to the invention for parallel transmission of analog and digital data using the method according to the invention.

In a schematic illustration, FIG. 2 shows an exemplary embodiment of an apparatus according to the invention for galvanically isolated energy transmission; see arrow 20 between a power transmitter 10 and a power receiver 12 which—as indicated by the two parallel lines 18—are galvanically isolated from one another. Control data 22a produced by the power receiver 12 and status information 24a on the part of the power receiver are supplied to a data transmitter 14. The latter transmits, in parallel fashion, the analog control data 22a in digitized form and the status information 24a by analog-digital event modulation—as indicated by the arrow 26—to the power transmitter side.

The transmitted data are demodulated in a data receiver 16 on the part of the power transmitter and provided as digital status information 24b, on the one hand, and control data 22b provided for the power transmitter 10.

Consequently, the method according to the invention serves for the parallel transmission of a digitized analog variable with a high data rate and a parallel, digital information transmission with a lower data rate. Without the present invention being restricted thereto, the digitized analog variable preferably corresponds to a measurement variable that is needed to close a control loop 28, indicated in FIG. 2, in the following exemplary embodiments. However, this should not mean any restriction to control information. In the shown exemplary embodiments, the digital information with a lower data rate should correspond to status information and likewise be non-restrictive.

In the exemplary embodiments of the present invention shown below, it is irrelevant in respect of the control information transmission of a system for wireless energy transmission whether the digital regulator is implemented on the part of the power transmitter or power receiver. In the first case, the digitized measurement value or the digitized system deviation is transmitted back to the power transmitter 10 by the power receiver 12 and supplied to a digital regulator. In the second case, the system deviation is supplied to a digital regulator already on the power receiver 12 and only the digitized manipulated variable is transmitted back to the power transmitter 10.

Nor should the shown direction of information transmission be limited. Thus, the same method can be used to transmit a status value and a digitized analog value from a power transmitter 10 to a power receiver 12. A half-duplex or full-duplex transmission is also possible, i.e., a method in which transmission is always only carried out in one direction or a method in which transmission can be carried out in both directions.

A discretization and quantization of a controlled variable, such as the output voltage, for example, is always required for the digital feedback control of an analog variable, such as the output voltage of a wireless energy transmission system, for example. In many cases, the analog variable to be controlled is sampled by means of an analog-digital converter (ADC) and converted into digital values for this purpose. Here, a digital value is assigned to each ascertained analog measurement value. The set or number of possible, digitized analog values, which is denoted by $n_{AD}$ below, is always restricted (quantization). By way of example, in the case of a 12 bit ADC, $n_{AD}$ is $2^{12}=4096$. The measured, digitized analog value $AD_x$ in this case has a value between 0 and 4095.

It is irrelevant to the method according to the invention whether this digitized analog value is transmitted directly to the power transmitter 10 or whether there still is further processing, for example by a filter or digital regulator, on the part of the power receiver. All that is decisive is that a digitized analog value is transmitted in all cases.

In order to facilitate transmission of the required information as efficiently as possible, the digitized analog value $AD_x$ at the signal transmitter 14 is converted directly to a number of events, which should be transmitted, after defining a minimum event number $n_{min}$ and a maximum event number $n_{max}$. Here, $$n_{low}(AD_x) = n_{min} + f1(AD_x)$$

and $$n_{high}(AD_i) = n_{max} - f2(AD_x)$$

apply. In the exemplary embodiment below, the functions f1 and f2 are selected to be very simple for the purposes of an easier understanding, and so the following arises:

$$n_{low}(AD_x) = n_{min} + AD_x$$

and $$n_{high}(AD_x) = n_{max} - AD_x.$$

Figure 3:
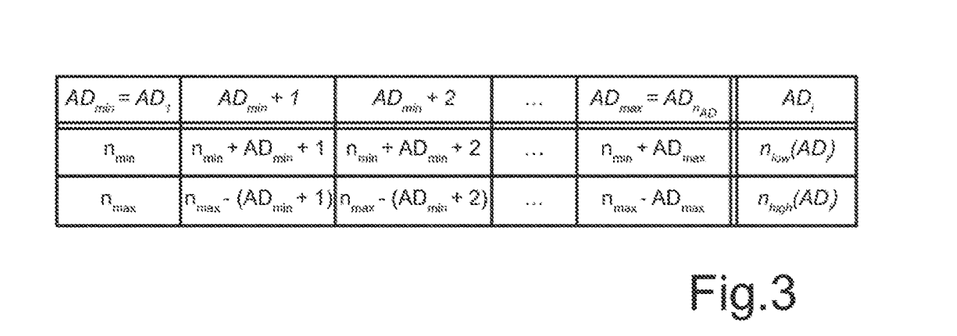
FIG. 3 shows an example of an event table as used in an embodiment of the method according to the invention.

Using these equations, it is possible to determine the general event table illustrated in FIG. 3. Said event table is based on setting a minimum event number $n_{min}$, a maximum event number $n_{max}$, the number of possible digitized analog values $n_{AD}$ and the minimum digitized analog value $AD_{min}$. The second line defines a first value range $n_{low}(AD_i)$, which starts at $n_{min}$ and ends at $n_{min} + AD_{max}$. The third line defines a second value range $n_{high}(AD_i)$, which starts at $n_{max}$ and ends at $n_{max} - AD_{max}$.

The minimum and maximum event numbers $n_{min}$ and $n_{max}$ can now be chosen in such a way that $$n_{low}(AD_{n_{AD}} = AD_{max}) < n_{high}(AD_{n_{AD}} = AD_{max})$$

applies.

Hence, the first and the second value range are disjoint and, in addition to directly determining the original, digitized analog value from a number n of transmitted results, it is also possible to directly determine whether a value is present in the event window $n_{low}$ (see FIG. 3, second line) or in the event window $n_{high}$ (see FIG. 3, third line).

This number n of events is now transmitted immediately by way of any transmission channel. By receiving $n_{min}$ events, for example, it is known that the digitized analog value $AD_{min}$ was transmitted in the event window $n_{low}$. By contrast, if $n_{max} - (AD_{min} + 2)$ events are captured, for example, the digitized analog value $AD_{min} + 2$ is transmitted in the event window $n_{high}$.

In this way, respectively one event number in the window $n_{low}$ and one in the window $n_{high}$ is assigned to each digitized analog value $AD_x$ according to $n_{low}(AD_x)$ and $n_{high}(AD_x)$. This additional information can now be used to also transmit digital values in addition to the digitized analog values.

The digitized analog value $AD_x$ is immediately available for the data receiver 16 after receiving the event number n. The digital protocol which may be required for the digital signal transmission using the event windows $n_{low}$ and $n_{high}$ should not be part of the notice of invention. Accordingly, two values are available, i.e., one in the event window $n_{low}$ and one in the event window $n_{high}$, which values can be used in very different ways for data transmission purposes.

Figure 4:
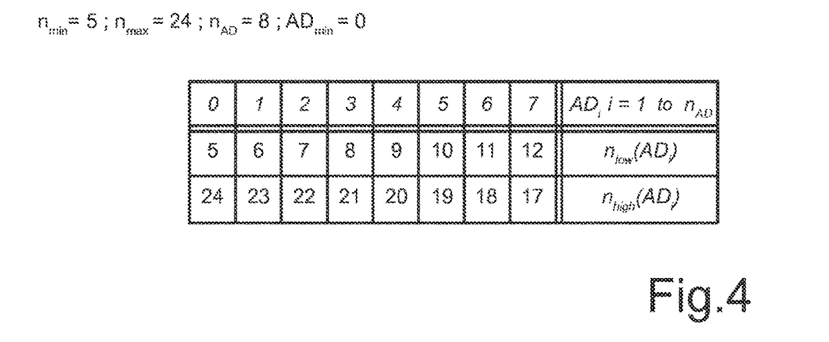
FIG. 4 shows the event table of FIG. 3 for predetermined values of $n_{min}$, $n_{max}$, $n_{AD}$ and $AD_{min}$.

With reference to FIG. 4, $n_{AD} = 8$ and the digitized analog values $AD_i$ (i=1 . . . $n_{AD}$) should originate from the set 0, 1, 2, . . . 7 in the following example for elucidation purposes. These values should be modulated and transmitted. A minimum event number of $n_{min} = 5$ and a maximum event number of $n_{max} = 24$ are defined. Using these, it is possible to create the table illustrated in FIG. 4. From this table, the event numbers $n_{low}(3) = 8$ and $n_{high}(3) = 21$ can be read in the case of a digitized analog value $AD_x = 3$, for example.

Figure 5:
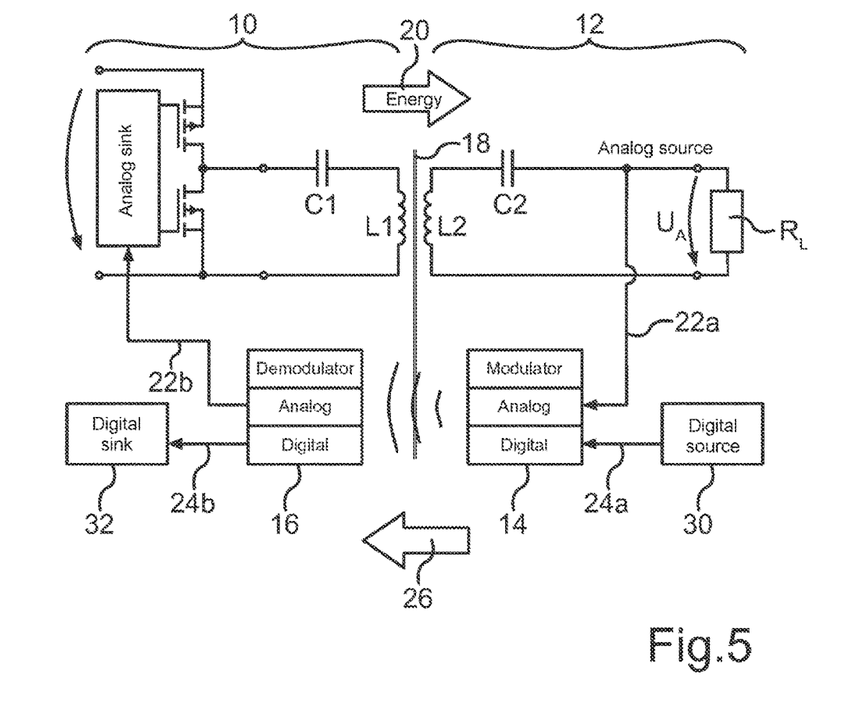
FIG. 5 shows a schematic illustration of an exemplary embodiment of an apparatus according to the invention for galvanically isolated energy transmission.

As an example embodiment of an apparatus according to the invention, FIG. 5 shows an inductive and galvanically isolated energy transmission system. Here, energy, see arrow 20, is transmitted from a power transmitter 10 to a power receiver 12. For the purposes of a feedback control of an exact output voltage $U_A$, the latter should be captured (analog source), optionally processed and then supplied to a digital regulator. Since the manipulated variable of the energy transmission is situated on the transmission side, the transmission of a digitized analog value from the power receiver 12 to the power transmitter 10 is necessary. Here, the power receiver 12 acts as an analog source; the power transmitter 10 acts as an analog sink. Since the transmission of digital information should also be possible in addition to the feedback control, a digital data source 30 and a digital data receiver 32 are present. The remainder of the structure comprising the capacitors C1, C2 and the inductors L1 and L2 is well known in the art.

The transmission of the digitized analog information $AD_x$ and the digital information $D_x$ is implemented by way of a common transmission channel, such as, e.g., an inductive coupling or an optical coupler (e.g., optocoupler), using the method according to the invention.

It is possible to distinguish between direct and indirect modulation in the method according to the invention:

In the case of direct ADEM, the event numbers $n_{low}(AD_x)$ and $n_{high}(AD_x)$ are each transmitted by a countable event, which occurs with a frequency of $n_{low}(AD_x)$ or $n_{high}(AD_x)$. In the simplest example of an optical transmission, the shining of a light-emitting diode could be activated and deactivated in a manner corresponding to the event number. The spacing of the events can be known, equidistant, or else arbitrary.

Figure 6:
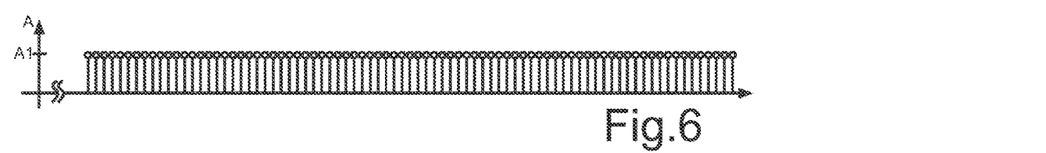
FIG. 6 shows an illustration showing a temporally equidistant distribution of events.

FIG. 6 shows a temporal sequence of events with a predeterminable amplitude A1 in the case of an equidistant distribution of events. If only events are counted in the case of direct ADEM, the amplitude can vary and therefore plays only a subordinate role.

Figure 7:
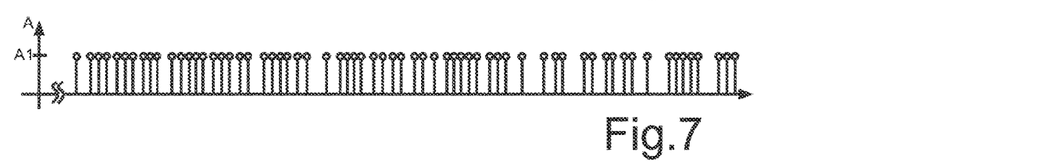
FIG. 7 shows an illustration showing a temporally arbitrary distribution of events.

FIG. 7 shows a corresponding representation in the case of an arbitrary distribution of events.

Figure 8:
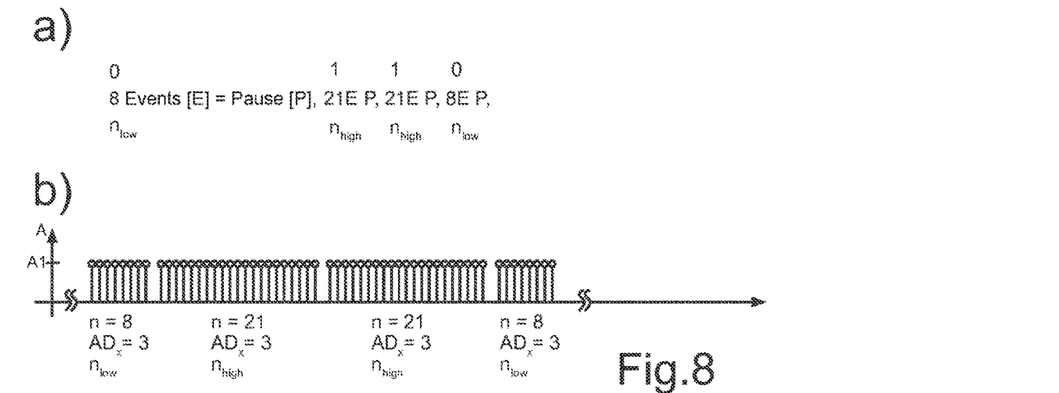
FIG. 8 shows a schematic illustration relating to a first exemplary embodiment of the method according to the invention.

By way of example, if the digitized analog value $AD_x = 3$ should be transmitted and the digital combination 0, 1, 1, 0 should be transmitted at the same time, event packets according to the representation in FIG. 8a can be transmitted in accordance with the events table in FIG. 4. Accordingly, an event number from the value range $n_{low}(AD_i)$ is chosen for transmitting a digital 0 and an event number from the value range $n_{high}(AD_i)$ is chosen for transmitting a digital 1. Since, as explained above, a digitized analog value $AD_x = 3$ should be transmitted in the example, eight events E are accordingly transmitted to transmit a digital 0 and 21 events E are accordingly transmitted to transmit a digital 1. A pause P is inserted for distinguishing the events. The transmitted signal, see arrow 26 in FIG. 5, is illustrated in FIG. 8b.

An additional increase in the transmission speed can be realized by virtue of facilitating a distinction of the event packets by measurement. In this case, the pause P is no longer required. By way of example, if an additional modulation of the amplitude (ASK=Amplitude Shift Keying) is facilitated, an event packet change can be determined on the basis of a change in amplitude, with the digitized analog value $AD_x$ still being represented by the number of events.

Figure 9:
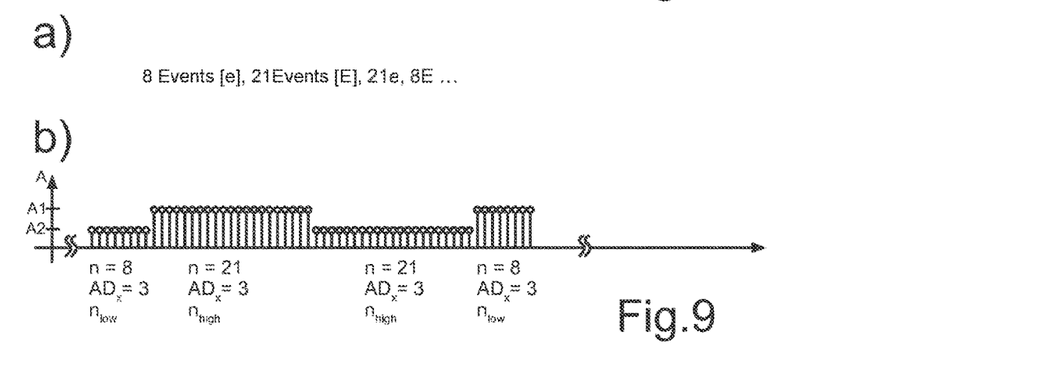
FIG. 9 shows a schematic illustration relating to a second exemplary embodiment of the method according to the invention.

FIG. 9a shows the events to be transmitted, where an "e" event is denoted by the amplitude A2 and an "E" event is denoted by the amplitude A1.

Figure 10:
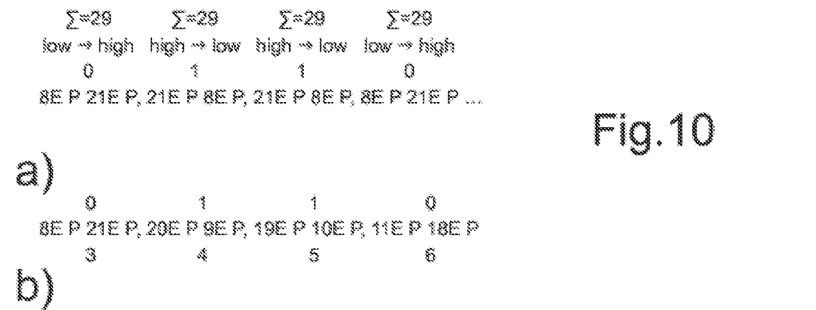
FIG. 10 shows the temporal sequence of the events to be transmitted in the case of the Manchester code.

Equidistant sampling of the measurement variable is often very advantageous for digital feedback control purposes. If this is desired, a Manchester code can be used for the digital data transmission. By way of example, if the assumption is made that a logical 1 is described by a high-low change and a logical 0 is described by a low-high change when using equidistant events according to FIG. 6 and if, further, a digitized analog value applies to two event packets in each case, both the digitized analog values and the digital values are available in temporally equidistant form. The sequence as illustrated in abbreviated form in FIG. 10 emerges for the digital value 0, 1, 1, 0.

In this example, a digitized symbol has the constant duration of two pauses [P] and 29 events [$n_{min}+n_{max}$] and, accordingly, it is independent of the digitized analog value. However, depending on the analog value, the transmission speed of analog and digital value is halved in comparison with the application example illustrated in FIG. 8 since a logical state is always represented by combination of low and high.

Figure 11:
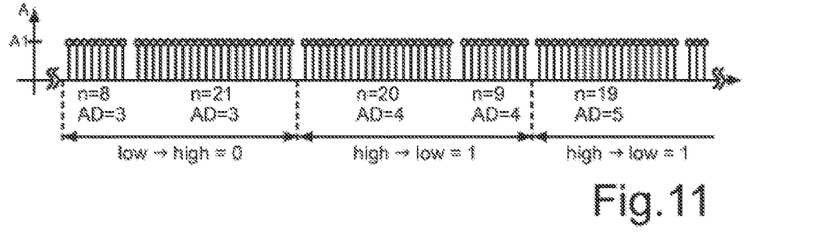
FIG. 11 shows a schematic illustration relating to a third exemplary embodiment of the method according to the invention.

However, for elucidation purposes, the transmission of the digital information 0, 1, 1, 0 should be specified with an increasing digitized analog value 3, 4, 5, 6. The sequence illustrated in FIG. 11*a* follows from the table according to FIG. 4. The associated temporal event modulation is shown in FIG. 11*b*.

The duration of a digital symbol is constant with the sum of 29E and 2P.

A further advantage of the Manchester code consists of a DC component freedom being facilitated depending on the form of the events; this is particularly advantageous in the case of inductive transmission methods, for example. At the same time, a timing recovery is possible.

Here too, an additional increase in the transmission speed in accordance with the exemplary embodiment by means of ASK illustrated in conjunction with FIG. 9 is possible.

It is also possible that even though use is made of a digital Manchester code, the analog value is adapted in each period packet. As a consequence of this, the number of digitized analog values doubles but the equidistant property only remains approximately present for the digital value in the steady-state condition of a feedback control. Since the transmission according to the Manchester code is implemented in terms of signal changes (low/high or high/low), it may be possible, for example, for a different analog value to be present when transmitting low digital information than when transmitting the high digital information. Hence, a signal length overall that is not constant would arise.

Figure 15:
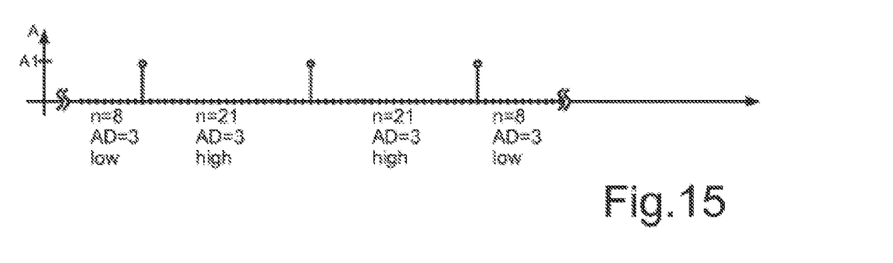
FIG. 15 shows a schematic illustration relating to a seventh exemplary embodiment of the method according to the invention.

Indirect ADEM:

In the case of indirect ADEM, any signal with a controllable period duration can be used to transmit a digitized analog value. What is decisive is that an evaluation apparatus is present, the latter ascertaining the number of events that have occurred or could occur during the period duration T. The last-mentioned case becomes clearer with reference to FIG. 15, bottom. Here, the number of possible events are counted between the actually transmitted events.

In general, a type of frequency modulation can be used for analog and parallel digital data transmission in the case of indirect ADEM, for example if the transmission channel is excited with any periodic signal form of the frequency 1/T(n) at every event package.

Figure 12:
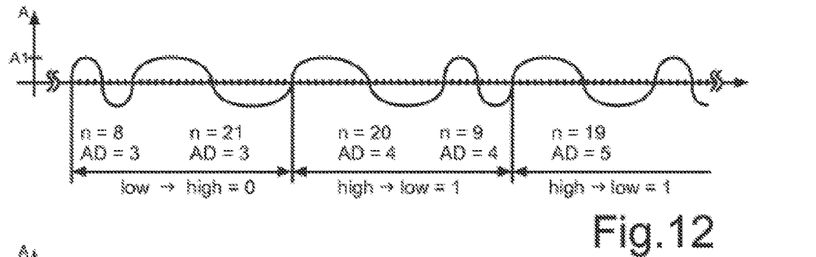
FIG. 12 shows a schematic illustration relating to a fourth exemplary embodiment of the method according to the invention.

In this context, FIG. 12 shows the temporal sequence of the transmission of the signal, known from FIG. 11*a*, by means of a sinusoidal, Manchester-encoded indirect ADEM.

Particularly preferably, the excitation of the transmission channel per event packet can be activated for a time duration $t_{on}(n)=n*\Delta t*D$ and deactivated for a time duration $t_{off}(n)=n*\Delta t*(1-D)$. The time duration $\Delta t$ and the duty cycle D can be chosen as desired in this case; they can even likewise be modulated for extending the transmission options.

Figure 13:
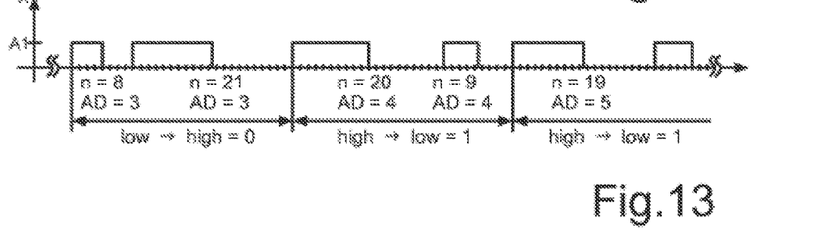
FIG. 13 shows a schematic illustration relating to a fifth exemplary embodiment of the method according to the invention.

In this context, FIG. 13 shows the transmission of the sequence of FIG. 11*a* by means of a rectangular, Manchester-encoded, indirect ADEM, where the duty cycle D was chosen to be 0.5.

By way of an additional modulation of the duty cycle D, it is possible, for example, to increase the number of transmittable, digitized analog values or of the digital values as desired. Thus, for example, with $n_{AD}=8$ and D=[0.3; 0.7], 16 signal forms could be produced and transmitted instead of eight, which can be used, for example, for doubling the number of analog values according to $n_{AD_{eff}}=2*n_{AD}$. Moreover, $D=f(AD_x)$ could also hold true or be based on a third signal.

Figure 14:
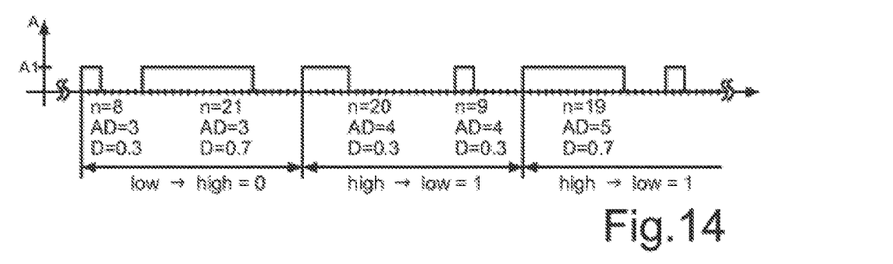
FIG. 14 shows a schematic illustration relating to a sixth exemplary embodiment of the method according to the invention.

In this context, FIG. 14 shows a rectangular, Manchester-encoded indirect ADEM with additional pulse width modulation by providing two values, specifically 0.3 and 0.7, for the duty ratio D for the example illustrated in FIG. 11*a*.

The implementation of the sequence illustrated in FIG. 11*a* can be inverted according to FIG. 11*b*. By way of example, if a circuitry-based evaluation apparatus is present, which measures the duration between any two occurrences (this corresponds to the pauses in the specified example embodiments) and which determines the number of possible events between the occurrences, a parallel transmission of analog and digital values is likewise possible. In comparison with the illustration of FIG. 11*b*, there is a change in the polarity which may be advantageous for the electrical efficiency and the electromagnetic compatibility; in this respect, see FIG. 15.

This form of modulation has advantageous effects on the electrical efficiency and on the electromagnetic compatibility because the excitation of the channel is very low on average. A similar effect can be obtained if the exemplary embodiment illustrated in FIGS. 13 and 14 is operated with a low value for the duty cycle D.

If the direct determination of the number of events is not possible on account of an inertia of the transmission channel, an enveloping event function is preferably detected. By way of example, if the physical channel is excited in some way for the time $t_{on}(n)$ and not excited immediately following this for the time $t_{off}(n)$, it is possible to ascertain the period duration of the enveloping function and determine both the transmitted analog value and the digital value.

Figure 16:
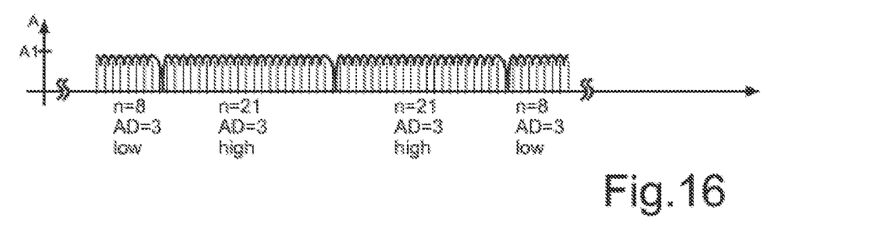
FIG. 16 shows a schematic illustration relating to an eighth exemplary embodiment of the method according to the invention.

In this context, FIG. 16 shows, for the example of FIG. 8*a*, that the transmitted information is contained in the envelope of a signal transmission.

Here, the type of excitation is arbitrary. Thus, the channel can be excited with a constant value or frequency during the time $t_{on}(n)$, for example. Alternatively, instead of being at rest, the channel could also be excited during the second phase $t_{off}(n)$ in a fashion that is different from the first phase.

The invention claimed is:

1. A method for transmitting analog and digital information while transmitting energy between a power transmitter and a power receiver galvanically isolated from said power transmitter, the method comprising the following steps:
   a) providing analog information and digital information to be transmitted;
   b) setting a number nAD of possible values ADi, i=1 to nAD, that are possible when digitizing the analog information, and a value range of the values ADi;
   c) assigning a digital value Dx to the digital information;
   d) setting a minimum event number nmin to be transmitted;
   e) setting a maximum event number nmax to be transmitted;
   f) setting a first image nlow defined by:

$$n\text{low}(ADi)=n\text{min}+f1(ADi), i=1 \text{ to } nAD;$$

g) setting a second image nhigh defined by:

nhigh(ADi)=nmax-f2(ADi), i=1 to nAD;

h) digitizing the analog information for obtaining a digitized analog value ADx;
i) determining an event number nlow(ADx)=nmin+f1(ADx)

for the bit of the digital value Dx to be transmitted in each case if the current bit of the digital value Dx to be transmitted is a logical 0; and
determining an event number nhigh(ADx)=nmax-f2(ADx)

for the bit of the digital value Dx to be transmitted in each case if the current bit of the digital value Dx to be transmitted is a logical 1, or vice versa; and
j) transmitting a signal that is correlated at least to the event number determined in step i).

2. The method as claimed in of claim 1, wherein a signal that is correlated to the serial sequence of the event number determined in step i) for each bit of the digital value $D_x$ is transmitted in step j).

3. The method of claim 1, wherein a signal is transmitted for the bit of the digital value to be transmitted, said signal being correlated to both a number of events according to the event number $n_{low}$ determined in step i) and a number of events according to the event number $n_{high}$ determined in step i), wherein a logical 1 of the bit of the digital value $D_x$ to be transmitted in each case is represented by a sequence $n_{high}$-$n_{low}$ and a logical 0 is represented by a sequence $n_{low}$-$n_{high}$ of the amplitude of the signal, or vice versa.

4. The method of claim 1, wherein in step j), the event number determined in step i) is transmitted in the form of a certain number of predeterminable events.

5. The method of claim 4, wherein between the individual bits to be transmitted of the digital value $D_x$ in the signal, a signal differing therefrom is inserted.

6. The method of claim 5, wherein the signal of the individual bits to be transmitted comprises a sequence of pulses, with the signal differing therefrom representing a pause; or in that the signal of the individual bits to be transmitted comprises a predeterminable time duration of a zero signal, with the signal differing therefrom representing a pulse.

7. The method of claim 4, wherein an amplitude change is undertaken in the signal between a current bit of the digital value $D_x$ to be transmitted and a next bit.

8. The method of claim 1, wherein the event number in the form of a signal, determined in step i), with a period duration depending on the event number determined in step i) is transmitted in step j).

9. The method of claim 8, wherein, for the purposes of producing the period duration, an excitation of the transmission with a predeterminable function is activated for a time duration $t_{on}=n_{low}*\Delta t*D$ or $t_{on}=n_{high}*\Delta t*D$ and deactivated for a time duration $t_{off}=n_{low}*\Delta t*(1-D)$ or $t_{off}=n_{high}*\Delta t*(1-D)$, where $\Delta t$ is a predeterminable time duration and D is a predeterminable duty cycle.

10. The method of claim 9, wherein the time duration $\Delta t$ and/or the duty cycle D is varied, in particular modulated, depending on the digitized analog value $AD_x$ to be transmitted.

11. The method of claim 1, wherein the following step is implemented at the receiver of the transmission:
k) evaluating the received signal for determining the transmitted analog value and the transmitted digital value.

12. The method of claim 11, wherein the envelope of the received signal, in particular the period duration of the enveloping function, is evaluated in step k).

13. The method of claim 1, wherein f1(ADi) and f2(ADi) are chosen in such a way that the first image and the second image are disjoint.

14. The method of claim 11, wherein f1(ADi) and f2(ADi) are chosen in such a way that the first image and the second image have a common overlap region, wherein a previously created probability function is used in step k) for determining the transmitted analog value and the transmitted digital value for a value in the overlap region.

15. The method of claim 14, wherein said method furthermore comprises the following step:
l) creating a statistic for the assignment of values in the overlap range to the first or second image depending on at least one previously transmitted value that is uniquely assignable to the first or the second image.

16. An apparatus comprising:
a power transmitter configured to transmit energy and provide analog information to
a power receiver galvanically isolated from the power transmitter and configured to receive the energy;
a digital source configured to provide digital information related to the power receiver;
a microcontroller configured to:
set a number $n_{AD}$ of possible values $AD_i$, i=1 to $n_{AD}$, that are possible when digitizing the analog information and set a value range of the values $AD_i$;
assign a digital value $D_x$ to the digital information;
set a minimum event number $n_{min}$ to be transmitted;
set a maximum event number $n_{max}$ to be transmitted;
set a first image $n_{low}$ defined by: $n_{low}(AD_i)=n_{min}+f1(AD_i)$, i=1 to $n_{AD}$;
set a second image $n_{high}$ defined by: $n_{high}(AD_i)=n_{max}-f2(AD_i)$, i=1 to $n_{AD}$;
digitize the analog information for obtaining a digitized analog value $AD_x$;
determine an event number $n_{low}(AD_x)=n_{min}+f1(AD_x)$ for the bit of the digital value $D_x$ to be transmitted in each case if the current bit of the digital value $D_x$ to be transmitted is a logical 0, and determine an event number $n_{high}(AD_x)=n_{max}-f2(AD_x)$ for the bit of the digital value $D_x$ to be transmitted in each case if the current bit of the digital value $D_x$ to be transmitted is a logical 1, or vice versa;
a data transmitter configured to transmit a signal that is correlated at least to the determined event number; and
a data receiver configured to receive the signal and communicate with the power transmitter.

* * * * *